Feb. 8, 1927.  1,617,094
C. ATHERTON
REMOTE CONTROL VALVE
Filed June 27, 1924   3 Sheets-Sheet 2
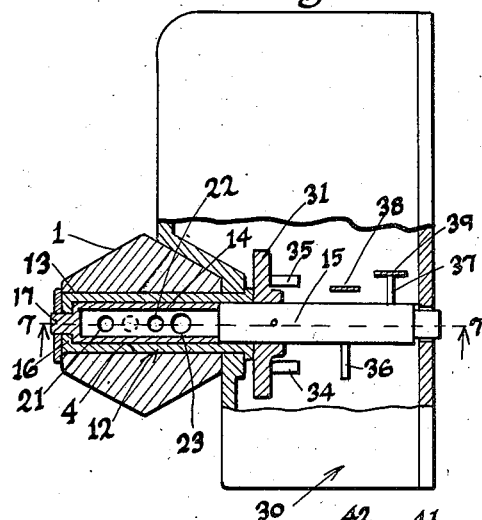
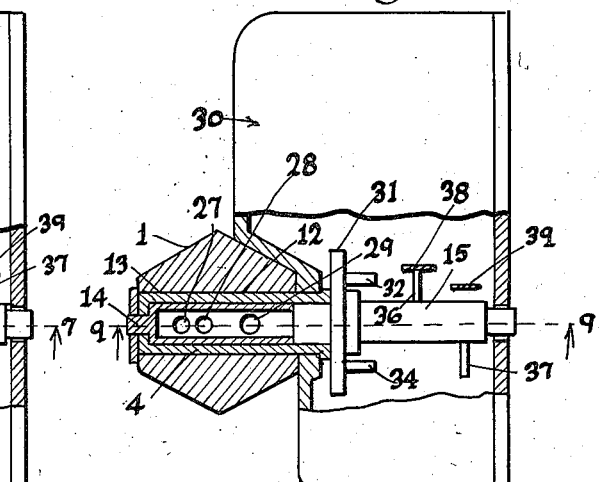
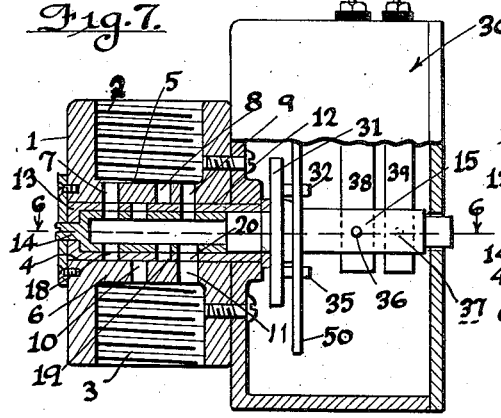
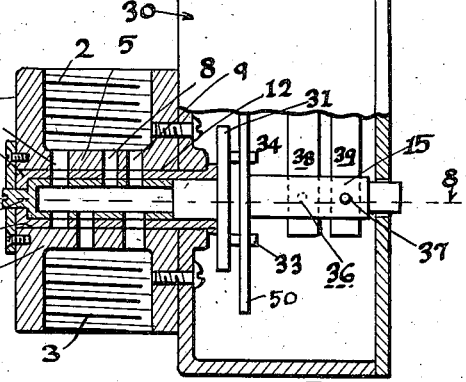
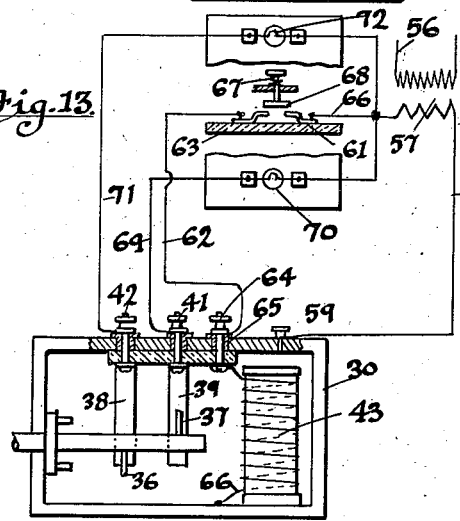
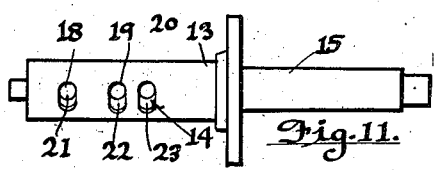
Inventor
Charles Atherton
By Hazard and Miller
Attorneys

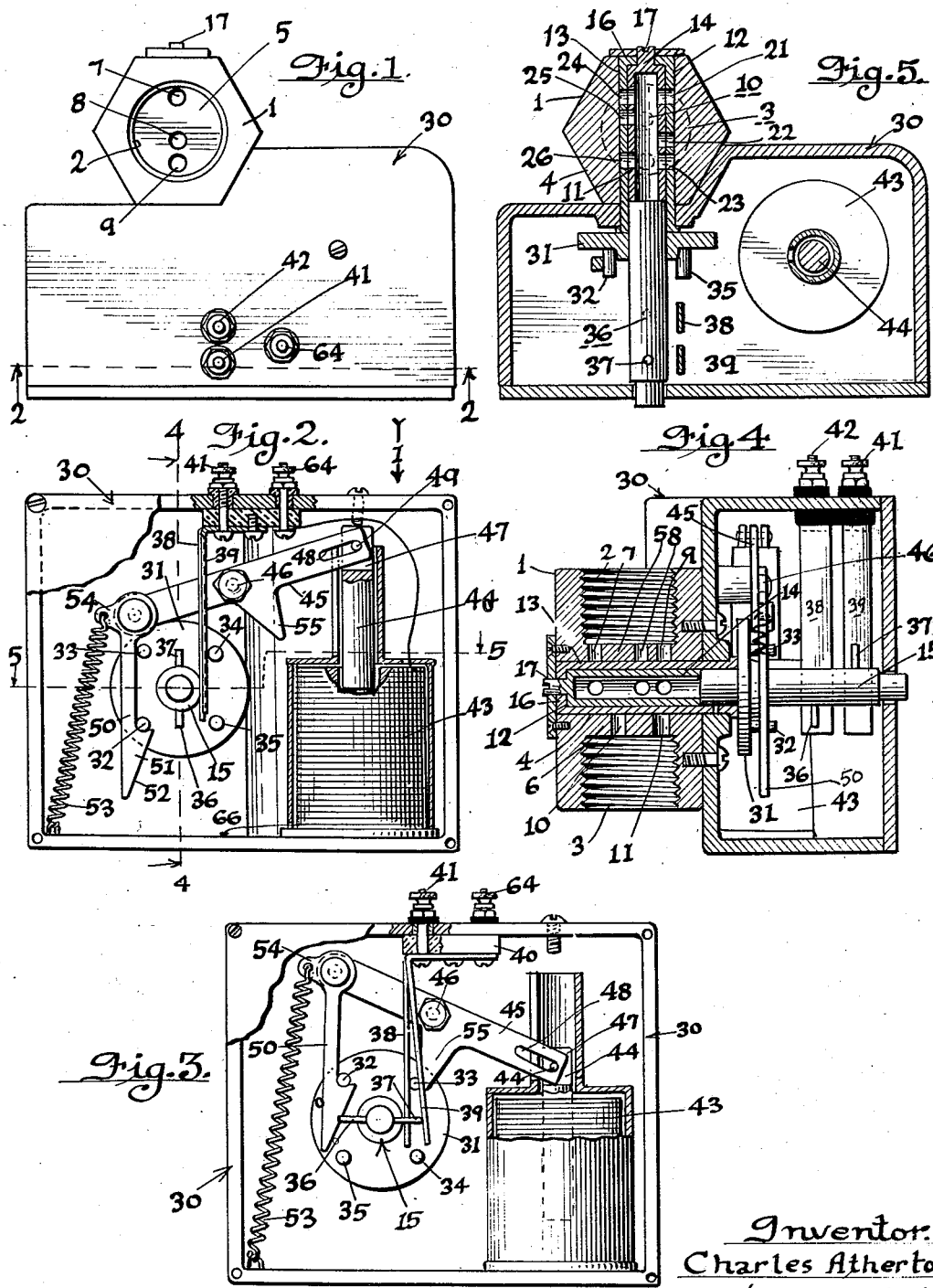

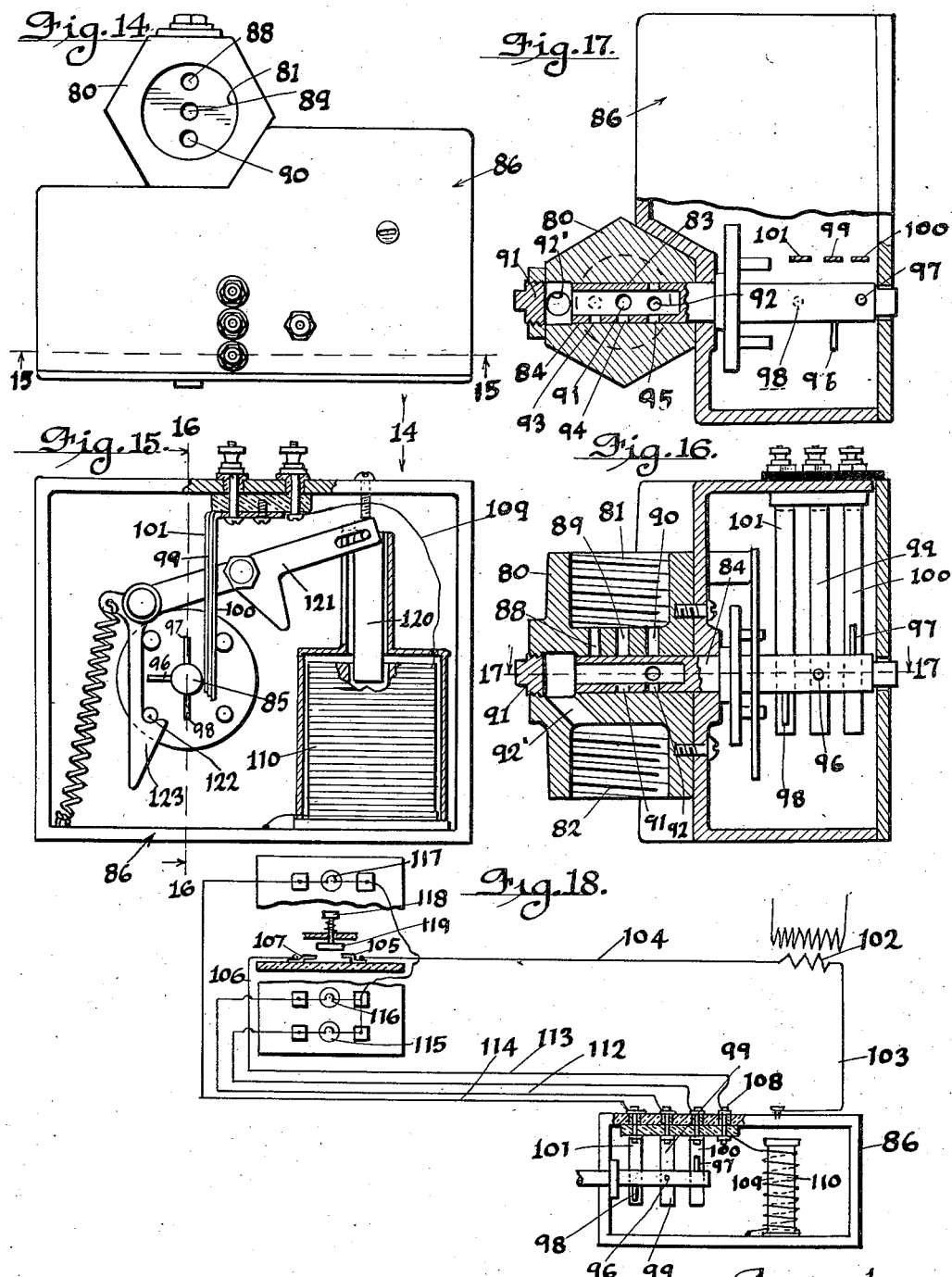

Patented Feb. 8, 1927.

1,617,094

UNITED STATES PATENT OFFICE.

CHARLES ATHERTON, OF PASADENA, CALIFORNIA, ASSIGNOR, BY DIRECT AND MESNE ASSIGNMENTS, TO HY-LO UNIT & METAL PRODUCTS, INC., OF PASADENA, CALIFORNIA, A CORPORATION OF CALIFORNIA.

REMOTE CONTROL VALVE.

Application filed June 27, 1924. Serial No. 722,880.

This invention is a remote control valve, and consists of the novel features herein shown, described and claimed.

An object is to place a control valve in position to regulate the flow of gas to a furnace in a basement or the like, place a push button mechanism in a living room or the like, remote from the furnace, and provide electrical mechanism and connections whereby the valve may be controlled by manipulating the push button, and to provide lamps near the push button for indicating the condition of the valve, that is, to indicate whether the valve is closed, moderately open or wide open.

Other objects and advantages will appear from the drawings and specification.

The drawings illustrate the construction and operation of a remote control valve embodying the principles of the invention.

Figure 1 is a top plan view of the valve and electric box controlling the valve, the view being taken looking in the direction indicated by the arrow 1 in Fig. 2.

Fig. 2 is a sectional elevation on the line 2—2 of Fig. 1 and looking in the direction indicated by the arrows and showing the parts in positions as when the valve is closed.

Fig. 3 is a view analogous to Fig. 2 and showing the parts in the positions assumed when the electrical mechanism has been energized to open the valve and turn on an indicator lamp.

Fig. 4 is a vertical section longitudinally of the axis of the valve and taken on the line 4—4 of Fig. 2 and looking in the direction indicated by the arrows.

Fig. 5 is a horizontal section on the line 5—5 of Fig. 2 and looking downwardly as indicated by the arrows.

Fig. 6 is a view analogous to Fig. 5 with the valve in position with one gas port open and one light burning, the view being taken on the line 6—6 of Fig. 7, and looking downwardly as indicated by the arrows.

Fig. 7 is a section on the line 7—7 of Fig. 6 and looking in the direction indicated by the arrows.

Fig. 8 is a view analogous to Fig. 6 with the parts in position with two gas ports open and the second lamp burning, the view being taken on the line 8—8 of Fig. 9 and looking downwardly as indicated by the arrows.

Fig. 9 is a section on the line 9—9 of Fig. 8 and looking in the direction indicated by the arrows.

Fig. 10 is a view in elevation showing the means for adjusting the size of the outlet ports of the valve.

Fig. 11 is a view analogous to Fig. 10 and showing the inlet ports of the valve, which are not adjustable.

Fig. 12 is a cross section on the line 12—12 of Fig. 10, and looking in the direction indicated by the arrows.

Fig. 13 is a diagrammatic view of the electric system for operating the valve from a remote point.

Fig. 14 is a view analogous to Fig. 1 and showing a modification to make a three port step by step valve, and the view being taken looking in the direction indicated by the arrow 14 in Fig. 15.

Fig. 15 is a sectional elevation on the line 15—15 of Fig. 14, and looking in the direction indicated by the arrows.

Fig. 16 is a vertical sectional detail longitudinally of the axis of the valve and taken on the line 16—16 of Fig. 15, and looking in the direction indicated by the arrows.

Fig. 17 is a horizontal section on the line 17—17 of Fig. 16 and looking downwardly as indicated by the arrows.

Fig. 18 is a diagrammatic view of the electric mechanism for operating the three step valve shown in Figs. 14 to 17.

Figures 1 to 13 show a two step valve.

The details of construction and operation of the two step valve shown in Figs. 1 to 13 are as follows:

The valve fitting 1 has an upper internally screw threaded opening 2 and a lower internally screw threaded opening 3, and when the fitting is incorporated into the gas feed pipe of a furnace, the full gas supply and pressure will come to the opening 2, and the regulated burner supply will pass from the opening 3. A straight bore 4 is formed through the fitting 1 transversely half way between the openings 2 and 3, leaving a web 5 at the bottom of the opening 2 and a web 6 at the top of the opening 3. Inlet ports 7, 8 and 9 are formed through the web 5 to the bore 4, and outlet ports 10 and 11 are formed through the web 6 to the bore 4. The valve plug or rotating member 12 is mounted in the bore 4 and the details are as follows:

A sleeve 13 fits in the bore 4. A second sleeve 14 fits snugly in the sleeve 13. An operating stem 15 is secured to the sleeve 13 by a pin, key or the like to hold the sleeve 14 in place and to rotate the valve. A head 16 is formed at the opposite end of the sleeve 13 from the stem 15 and a kerfed stem 17 extends through the head 16. Circumferentially elongated ports 18, 19 and 20 are formed through the sleeve 13 and adapted to register with the ports 7, 8 and 9 respectively. Circular ports 21, 22 and 23 are formed through the sleeve 14 and register with the ports 18, 19 and 20. Circular outlet ports 24, 25 and 26 are formed through the sleeve 13 diametrically opposite the ports 18, 19 and 20, and similar circular ports 27, 28 and 29 are formed through the sleeve 14 and adapted to register more or less with the ports 24, 25 and 26, so that by applying a screw-driver or the like to the kerfed stem 17 and rotating the sleeves 13 and 14 relative to each other, the outlet ports 24, 25 and 26 may be adjusted in effective size.

When the stem 15 is rotated to bring the port 26 into registration with the port 11, as in Fig. 7, the elongated ports 18 and 20 will be in registration with the ports 7 and 9, and the burner will be supplied with gas at half capacity and number one lamp will be illuminated; and when the stem 15 is rotated a quarter turn all the ports of the valve plug 12 will be out of registration and the gas will be shut off and the lamps extinguished; and when the stem 15 is rotated another quarter turn, the ports 25 and 26 will be in registration with the ports 10 and 11 and two streams of gas will flow to the burner to supply the burner to full capacity and number two lamp will be illuminated. Another quarter turn of the stem 15 will again shut the gas off and extinguish the lamp.

The details of the electric mechanism for operating the valve from a remote point are as follows:

The stem 15 extends through a box 30. A wheel 31 is fixed upon the stem against the back of the box. Pins 32, 33, 34 and 35 are fixed in the wheel and extend parallel with the axis of the stem 15 and are evenly spaced apart. A contact pin 36 is fixed in the stem 15 and extends radially. A similar contact pin 37 is fixed in the stem 15 and extends radially and diametrically opposite the pin 36 and is spaced longitudinally from the plane of the pin 36. Insulated spring brushes 38 and 39 are secured to an insulation block 40 by binding screws 41 and 42, and the brushes extend downwardly in planes to be out of contact with the stem 15, and so that the contact pin 36 will engage the brush 38 and the contact pin 37 will engage the brush 39 when the stem 15 is rotated.

A solenoid or plunger electromagnet 43 is mounted in the box 30 and has a core or plunger 44 adapted to reciprocate in a vertical plane. A lever 45 is mounted upon a pivot 46 secured to the box 30. The upper end of the plunger 44 has a slot 47, and one end of the lever 45 fits in the slot 47 and has a slot 48, and a pin 49 is fixed through the plunger and through the slot 48 so that as the plunger 44 reciprocates the lever 45 is vibrated upon the pivot 46. A dog 50 is pivotally connected to the opposite end of the lever 45 from the plunger 44 and has a hook 51 adapted to engage the pins 32, 33, 34 and 35 step by step, and the dog 50 has a long tapered guide point 52 to keep the dog from passing inside of the pins. A retractile coil spring 53 connects an arm 54 extending from the upper end of the dog 50 to the box 30, the tension of the spring being exerted to throw the dog 50 inwardly to bear against the pins 32, 33, 34 and 35. A stop arm 55 extends from the central portion of the lever 45 to engage the pins 32, 33, 34 and 35 and hold the stem 15 from spinning. Every time the plunger 44 goes down by the energizing of the solenoid 43, the valve stem 15 will be moved a quarter turn.

Referring to Fig. 13, the main electric line 56 passes through a transformer 57 and the line 58 from one end of the transformer is grounded upon the box 30 by the binding post 59. The line 60 from the other end of the transformer goes to the switch member 61, and the line 62 from the switch member 63 goes to the binding post 64 which is insulated from the box 30 by a sleeve 65, and the lower end of the binding post 64 is connected to the solenoid 43, and the other end 66 of the solenoid is grounded upon the box 30. The spring withdrawn push button 67 carries a contact member 68 which engages the switch members 61 and 63 and closes the circuit to energize the solenoid 43, and every time the push button 67 is pressed inwardly the valve stem 15 will be rotated one quarter of a revolution.

A line 69 runs from the binding post 41 through number one lamp 70 to the line 60, and a line 71 runs from the binding post 42 through number two lamp 72 to the line 60, so that when the pin 37 is in contact with the brush 39 number one lamp 70 is illuminated to show that the port 11 is flowing gas to the burner and that the burner is running at half capacity, and so that when the pin 36 is in contact with the brush 38 number two lamp 72 is illuminated to show that the ports 10 and 11 are both open and that the burner is running full capacity, and so that when the pins 36 and 37 are both out of contact with the brushes 38 and 39 the lamps 70 and 72 are extinguished and show that the burner is shut off. The lamp circuits from the lines 69 and 71 through the brushes 38 and 39 and pins 36 and 37 are grounded on the box 30 through the stem 15, and consequently the circuits are opened and closed by the operation of the pins 36 and 37.

Starting from the position shown in Fig. 2 with the pins 36 and 37 straight up and down and the gas shut off, one push of the button 67 will turn the burner on half capacity and illuminate lamp number one, the next push of the button 67 will shut the burner off, the third push of the button will bring the pin 36 into contact with the brush 38 and turn the burner on full capacity and illuminate lamp number two, and the fourth push of the button will shut the burner off.

Thus I have produced a two step valve electrically operated from a remote point.

The details of the modification producing a three step valve controlled from a remote point and shown in Figs. 14 to 18 are as follows:

The valve fitting 80 has an inlet opening 81 and an outlet opening 82 for the reception of gas pipes. A bore 83 is formed transversely through the fitting between the openings 81 and 82 and the valve plug or rotating member 84 fits in the bore 83 and has a stem 85 extending into the box 86. A bore 87 is formed from the end of the plug 84 opposite to the stem 85. Ports 88, 89 and 90 are formed from the bottom of the opening 81 to the bore 83. A plug 91 is screwed into the open end of the bore 83 and a port 92 leads from the open end of the plug 84 to the opening 82. One quarter of the periphery of the plug 84 is blank and closes the ports 88, 89 and 90, the second quarter of the plug has one port registering with either one of the port 88, 89 or 90, the third quarter of the plug has ports 91 and 92 adapted to register with the ports 89 and 90, and the fourth quarter has ports 93, 94 and 95 adapted to register with the ports 88, 89 and 90, so that if the stem 85 is in the position shown in Fig. 16 the gas burner is shut off and if the stem 85 is rotated a quarter turn the gas burner is being fed through one port to substantially one-third of the capacity of the burner, and if the stem is again rotated one quarter turn the gas burner is being fed through two ports, and if the stem is again rotated one quarter turn the gas burner is being fed through three ports and to its full capacity.

The electric mechanism and connections for operating this three step valve are substantially the same as the mechanism and connections for operating the two step valve, with the addition of a third lamp, a third brush and a third contact pin. The pins 96, 97 and 98 are fixed in the stem 85 to engage brushes 99, 100 and 101, corresponding to the three steps for the three open positions of the valve.

The transformer 102 is grounded upon the box 86 by a line 103. A line 104 connects the opposite end of the transformer 102 to the switch member 105, a line 106 connects the second switch member 107 to the insulated binding post 108 and one end 109 of the solenoid coil 110 is connected to the binding post 108, and the other end 111 of the coil is grounded on the box 86. Lines 112, 113 and 114 connect the brushes 101, 100 and 99 respectively through the lamps 115, 116 and 117 respectively to the line 104, and the brush circuits are grounded on the box 86 through the stem 85. A spring return push button 118 has a conductor 119 to connect the switch members 105 and 107 when the button is pushed inwardly, and pushing the button inwardly will energize the coil 110 to pull the plunger 120 to operate the lever 121 to engage one of the pins 122 by the hook 123 to rotate the stem 85 one quarter of a turn. Starting from the position shown in Fig. 15, the valve is closed and the burner shut off. Operating the push button 118 will bring the contact pin 97 into engagement with the brush 100 and move the valve to open one port and illuminate number one lamp 115. The next operation of the push button 118 will rotate the stem 85 another quarter of a turn and bring the pin 96 into contact with the brush 99 and open two ports in the valve and illuminate number two lamp 116. The next operation of the push button 118 will bring the pin 98 into contact with the brush 101, open three ports in the valve and illuminate lamp number three 117. The next operation of the push button 118 will bring the blank side of the plug 84 against the ports 88, 89 and 90 and shut the burner off.

Thus I have produced a three step valve electrically operated from a remote point.

Various changes may be made without departing from the spirit of the invention as claimed.

I claim:

1. A remote control valve comprising in combination a valve adapted for continuous rotation in one direction, an operating stem connected to the valve to rotate therewith, contact pins on the stem, brushes supported adjacent the stem to form an electric circuit by contact with the pins, electrical means to rotate the valve step by step and cause the pins to make and break an electric circuit at various positions of the valve.

2. A remote control valve comprising in combination a valve fitting having a rotary cylindrical valve plug mounted therein, a web in the fitting surrounding the plug and having ports therethrough to form an inlet and outlet side, ports in the plug adapted to register with the ports in the web, a stem forming an extension of the valve plug, contact pins attached to the stem, electric brushes positioned adjacent the stem and means to rotate the valve plug and stem step by step to open and close various ports in succession and to make and break an electric circuit between the brushes and the said pins.

3. A remote control valve comprising in combination a valve fitting, a box secured thereto, a rotary valve mounted in the fitting and having ports therethrough, webs in the fitting on each side of the valve plug having ports therethrough, a stem attached to the plug and rotatably mounted in the box, a series of pins secured to the stem, electrical brushes mounted in the box, electrical means positioned in the box having an operative connection with the stem to rotate the stem and the plug step by step in a continuous rotary direction, opening and closing the various ports in succession and causing the pins to make and break electric circuits with the brushes.

4. A remote control valve as claimed in claim 3, having in addition a wheel attached to the stem having a series of pins extending laterally therefrom, a rocking lever pivotally mounted in the box having a hanging dog secured at one end, a stop arm on the lever positioned to engage a pin when the lever is rocked in one direction and thereby stop the motion of the wheel and to release the pin and allow rotation in another position of the lever, a solenoid, and an operative connection between the said solenoid to operate the lever.

In testimony whereof I have signed my name to this specification.

CHAS. ATHERTON.